Figure 1:
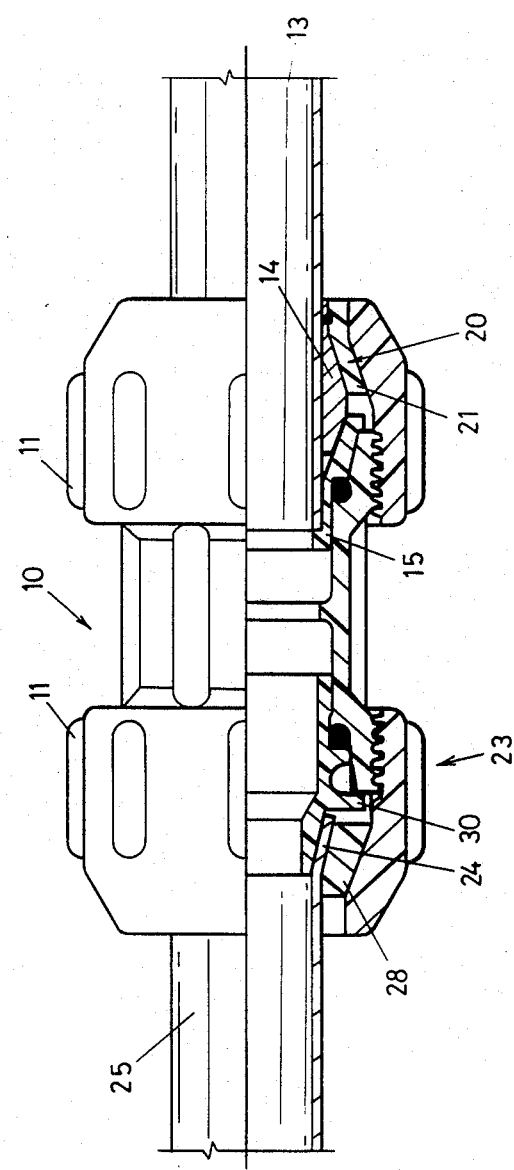

United States Patent [19]

Phillipps

[11] Patent Number: 4,822,082
[45] Date of Patent: Apr. 18, 1989

[54] TUBE CONNECTOR

[75] Inventor: Malcolm W. Phillipps, Stirling, Australia

[73] Assignee: Philmac Pty. Ltd., North Plympton, Australia

[21] Appl. No.: 76,595

[22] Filed: Jul. 23, 1987

[30] Foreign Application Priority Data

Jul. 24, 1986 [AU] Australia ............... PH7109

[51] Int. Cl.$^4$ ............................. F16L 19/04
[52] U.S. Cl. .................. 285/334.1; 285/334.5; 285/348; 285/369
[58] Field of Search ............... 285/334.5, 334.1, 369, 285/348

[56] References Cited

U.S. PATENT DOCUMENTS

| 2,430,657 | 11/1947 | Zolleis | 285/334.1 |
| 2,489,928 | 11/1949 | Phillips | 285/334.5 X |
| 2,529,534 | 11/1950 | Beerli | 285/334.5 X |
| 3,265,414 | 8/1966 | Reid et al. | 285/348 |
| 4,407,482 | 10/1983 | Daghe et al. | 285/334.5 X |

FOREIGN PATENT DOCUMENTS

| 534452 | 9/1980 | Australia. | |
| 1170729 | 5/1964 | Fed. Rep. of Germany | 285/334.5 |
| 1030380 | 6/1953 | France | 285/334.5 |

Primary Examiner—Thomas F. Callaghan
Attorney, Agent, or Firm—Bert J. Lewen; Henry Sternberg

[57] ABSTRACT

A tube connector fitting having a common body and common nuts screwed to its end, each end of the body has an enlarged portion which accepts any one of several inserts which, when inserted, comprises a sealing ring against a shoulder within the body. Different inserts are used for tubes of polyethylene and lead, steel, or copper tubing, but when copper tubing is used, its end is flared, and the flared end is clamped by the nut between a tapered backing sleeve and a tapered end surface of the relevant insert, and a very strong joint is thereby achieved. Inventory requirements are reduced since different bodies and nuts are not required for different pipes of similar size.

2 Claims, 2 Drawing Sheets

TUBE CONNECTOR

This invention relates to a tube connector fitting which is particularly useful for connecting copper tube end to end, polyethylene tube end to end, lead tube end to end, or any combination of the abovementioned tubes.

BACKGROUND OF THE INVENTION

In general plumbing work there is often a requirement to interconnect tubes end to end, whether those tubes be of the same material or not. Consequently it is necessary for plumbing suppliers to retain a large inventory of fittings, for example one fitting suitable for connecting to an end of a polyethylene tube, one fitting suitable for connecting to a copper tube, one fitting suitable for connecting to a lead pipe, and a combination of all those fittings. This is most inconvenient and expensive, and the main object of this invention is to provide a satisfactory fitting which can be used with a minimum of change over cost. For example, it is an object of the invention to provide a fitting comprising standard external parts, and sleeve and insert combinations which can be used for various types of tube or pipe, it being merely necessary to select the required inner elements to fit the fitting and be adaptable for securing the relevant pipe. The mathematical permutation for the abovementioned possibilities is six, whereas if another tube type (say British Standard Pipe) is added, the permutations total twenty-four, and therefore the above object can be regarded as seeking to (a) reduce inventory required for supplying the possible combinations, and (b) limit the variables to the inexpensive sleeves and inserts.

This problem has already been recognised, and the reader may refer to our Australian Patent No. 534,452 (the closest prior art known). The fitting disclosed therein is suitable for joining polyethylene or lead pipes, but was not suitable for joining copper or steel tubes. The invention disclosed herein is an extension of that earlier invention, and is directed primarily to the inclusion of copper or steel tubes to the pipes which may be included in those which can be joined with a single fitting, it being necessary merely to have alternative inserts and sleeves, and in some instances compression rings (olives).

BRIEF SUMMARY OF THE INVENTION

In this invention, a tube connector fitting has a common body and common nuts screwed to its end. Each end of the body has an enlarged portion which accepts any one of several inserts which, when inserted, comprises a sealing ring against a shoulder within the body. Different inserts are used for tubes of polyethylene and lead, steel, or copper tubing, but when copper tubing is used, its end is flared, and the flared end is clamped by the nut between a tapered backing sleeve and a tapered end surface of the relevant insert, and a very strong joint is thereby achieved. Inventory requirements are reduced since different bodies and nuts are not required for different pipes of similar size.

More specifically, the invention consists of a body having an external thread at each respective end, walls defining a passage extending through the body, the passage having a central portion and two identical outer portions, one at each end of the central portion, there being an annular shoulder between the central portion and each respective said end portion, a pair of hollow inserts each having a relatively smaller diameter tail freely insertable within said body central portion, a relatively larger diameter portion freely insertable within a said body outer portion, and a respective resilient sealing ring surrounding each said tail effecting a seal between that insert and the body, the outer surface of at least one of the inserts being tapered and converging in an axially outward direction, a backing sleeve having inner and outer tapered surfaces also converging in an axially outward direction, and a pair of hollow nuts each having an internal thread co-operable with a said body external thread, the inner surface of each nut including an outwardly converging portion adjacent the axially outward end of the nut thread.

The advantages of this invention are not merely limited to the advantages of low stock holding. The invention makes possible the provision of an extremely simple arrangement for connecting tubes of different types. Use may be made of flared end to flared end, of compression end to compression end, and any combination thereof. Each insert has a tail end which projects into a central body portion of the fitting. This will considerably assist in maintaining alignment of the pipes. In all instances, the seal can be achieved over a relatively wide area, and this is of considerable value where high pressres are encountered.

BRIEF DESCRIPTION OF THE PREFERRED EMBODIMENT

Figure 2:
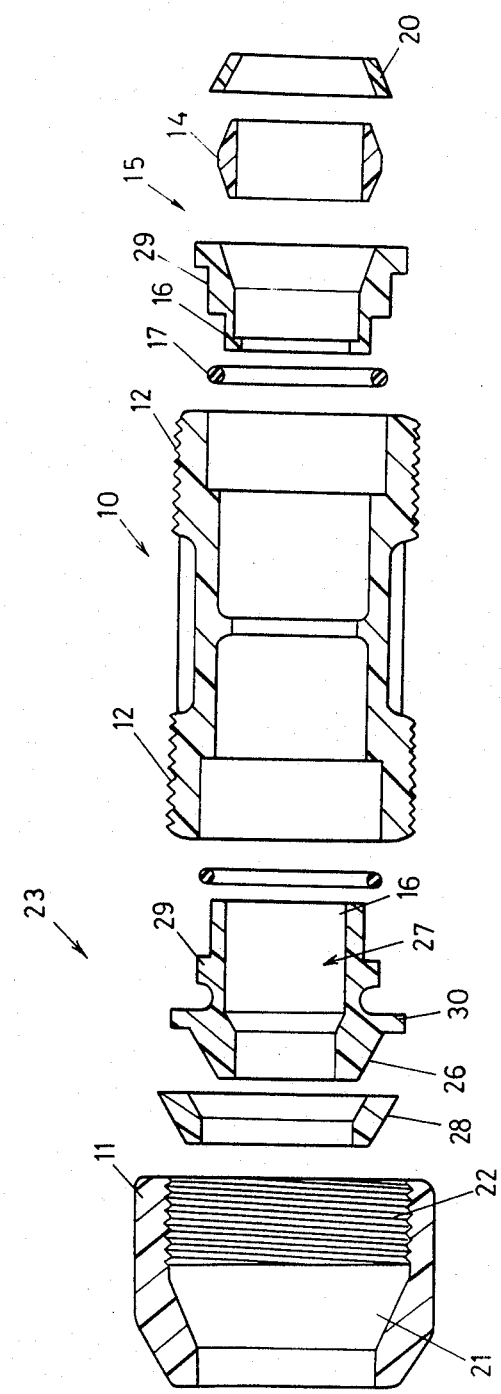

An embodiment of the invention is described hereunder in some detail with reference to and is illustrated in the accompanying drawings, in which FIG. 1 is a central section of an assembly of the fitting when used to join copper and steel tubing, and FIG. 2 is an "exploded" view of FIG. 1.

In this embodiment, a body 10 is provided with a pair of nuts 11, the body and nuts both being of a relatively hard plastics material. The outer surface of the body 10 terminates in threads 12 which are of buttress section, and the body and nuts are common for a range of different tubes which may have slight variations in outside or inside diameter (plastics, steel, lead and copper). The drawing illustrates two alternative types of assembly, and the type A assembly joins a copper tube 13 to the fitting by means of an olive 14, the olive 14 being of a polymeric or elastomeric material but it may alternatively be of a soft metal. An insert 15 is provided with a tail 16 which is directed axially inwardly, and between the tail and the body there is interposed an 'O' ring seal 17 so that the insert 15 sealably engages the body 10, and there is some tolerance of movement provided so that dimensional changes between the polymeric materials can be accommodated without loss of seal.

A nut reducing sleeve designated 20 is a backing sleeve and formed of polymeric material and this firmly engages the outer part-conical surface of the olive 14 and inner tapered surface 21 of the nut 11 adjacent the thread 22, being interposed between those surfaces such that upon tightening of the nut 20 onto the body 10, the olive 14 is radially inwardly compressed to firmly grip the end of the pipe 13. The type "A" connection is decribed in detail since it clearly illustrates the versatility of the fitting, but does not form part of this invention.

On the left hand side of the drawing there is shown type "B" assembly 23 which is similar to the type "A" assembly with the exception that the end 24 of a copper tube 25 is flared outwardly slightly, and this flared end 24 is interposed between an axially outwardly converging end portion of insert 27, while the backing sleeve 28 is formed from a polymeric material which is desirably softer than the material of the nut 11, and which therefore sealably engages the outer surface of the flared end 24. If the insert 27 is made from metal, a metal is chosen which is similar on the electrochemical scale to the metal of the pipe 25, and can be clamped with a minimum danger of corrosion occurring at that locality. Preferably, however, insert 27 is of polymeric material, and of similar construction to insert 15 insofar as its tail 16 and relatively larger portion 29 are concerned.

In both instances the nut, in its tightening mode, will bear against a backing sleeve 28, and damage is avoided which might otherwise occur (for example, due to the nut tearing the pipe metal). For the fitting to be useful under conditions of strain (which sometimes occur), it is desirable that the inserts be adequately supported by the body. This is effected with both inserts by engagement of the tail with the body inner surfaces, and axially spaced therefrom, engagement of the pipe by the olive 14 (type "A"), or the backing sleeve (type "B"). Flange 30 (type "B") further assists in this regard.

A consideration of the above embodiment will indicate that the invention provides means whereby an effective seal is achieved between the body and the inner insert, the body and the outer insert, and the outer insert and the olive or tube end as the case may be. The advantages of polymeric material can be employed with this fitting without the otherwise serious danger of leaks developing upon change of shape or dimension of the polymeric material.

What is claimed:

1. A tube connector fitting which is useful for connecting end to end a copper tube having a flared end with a second tube of one of copper, polyethylene, lead or steel, comprising
   a body having an external thread at each respective end, walls defining a passage extending through the body, the passage having a central portion and two identical outer portions, one at each end of the central portion, there being an annular shoulder between the central portion and each respective said end portion,
   a pair of hollow inserts each having a relatively smaller diameter tail freely insertable within said body central portion, a relatively larger diameter portion freely insertable within a said body outer portion, and a respective resilient sealing ring surrounding each said tail effecting a seal between tat insert and the body, the outer surface of at least one of the inserts being tapered and converging in an axially outward direction, an outstanding flange on each of said insert abutting a respective end of said body,
   a pair of backing sleeves each having inner and outer tapered surfaces also converging in an axially outward direction,
   and a pair of hollow nuts each having an internal thread co-operable with a respective one of said body external threads, the inner surface of each nut including an axially outwardly converging portion adjacent the axially outward end of the nut thread,
   said flared end of the copper tube being located between the outer tapered surface of the respective insert and the inner tapered surface of the respective backing sleeve, and clamped by the converging portion of the respective nut bearing against the outer tapered surface of said respective backing sleeve.

2. A tube connector fitting according to claim 1 wherein said sealing ring is an "O" ring of elastomeric material.

* * * * *